United States Patent
Nakatsuka et al.

(10) Patent No.: US 9,752,258 B2
(45) Date of Patent: Sep. 5, 2017

(54) CATIONIC-DYEABLE POLYESTER FIBER AND CONJUGATED FIBER

(75) Inventors: Hitoshi Nakatsuka, Kurashiki (JP); Kazuhiko Tanaka, Kurashiki (JP); Kazuhide Oka, Niihama (JP); Daisuke Ohga, Kurashiki (JP); Shinya Kawakado, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 465 days.

(21) Appl. No.: 14/000,779

(22) PCT Filed: Feb. 17, 2012

(86) PCT No.: PCT/JP2012/053765
§ 371 (c)(1),
(2), (4) Date: Aug. 21, 2013

(87) PCT Pub. No.: WO2012/114990
PCT Pub. Date: Aug. 30, 2012

(65) Prior Publication Data
US 2013/0323505 A1    Dec. 5, 2013

(30) Foreign Application Priority Data

Feb. 21, 2011  (JP) ................... 2011-034134
Aug. 31, 2011  (JP) ................... 2011-188129

(51) Int. Cl.
*D02G 3/36*  (2006.01)
*D01F 8/14*  (2006.01)
(Continued)

(52) U.S. Cl.
CPC .......... *D02G 3/36* (2013.01); *C08G 63/6886* (2013.01); *D01D 5/34* (2013.01); *D01F 6/84* (2013.01);
(Continued)

(58) Field of Classification Search
CPC .............. C08G 63/6886; C08G 63/183; C08G 63/672; C08G 63/83; D01D 5/34;
(Continued)

(56) References Cited

U.S. PATENT DOCUMENTS 5,087,519 A    2/1992  Yamaguchi et al.
5,637,398 A *  6/1997  Araki et al. ................. 428/364
(Continued)

FOREIGN PATENT DOCUMENTS

JP    1 266220    10/1989
JP    3 174015     7/1991
(Continued)

OTHER PUBLICATIONS

International Search Report Issued Mar. 13, 2012 in PCT/JP12/053765 filed Feb. 17, 2012.

*Primary Examiner* — Hai Vo
(74) *Attorney, Agent, or Firm* — Oblon, McClelland, Maier & Neustadt, L.L.P.

(57) ABSTRACT

A fiber made of a polyester copolymer (B), wherein the polyester copolymer (B) comprises a dicarboxylic acid component and a glycol component, and the dicarboxylic acid component comprises 75 mol % or more of a terephthalic acid component, 1.0 mol % to 3.5 mol % of component (a) derived from a compound represented by formula (I), 2.0 mol % to 10.0 mol % of a cyclohexane dicarboxylic acid component (b), and 2.0 mol % to 8.0 mol % of an aliphatic dicarboxylic acid component (c). This can afford a polyester fiber that exhibits deep color property to cation dyes and disperse dyes under a normal pressure environment and is superior in color fastness to washing and color fastness to light and can secure good spinnability.

6 Claims, 1 Drawing Sheet

(51) Int. Cl.
- *D01F 6/84* (2006.01)
- *C08G 63/688* (2006.01)
- *D01D 5/34* (2006.01)
- *D01F 8/10* (2006.01)
- *D01D 5/253* (2006.01)

(52) U.S. Cl.
CPC .................. *D01F 8/10* (2013.01); *D01F 8/14* (2013.01); *D01D 5/253* (2013.01); *Y10T 428/2929* (2015.01)

(58) Field of Classification Search
CPC ...... D01D 5/253; D01D 5/12; D01D 10/0481; D01D 10/02; D01F 6/84; D01F 8/10; D01F 8/14; D01F 6/34; D01F 6/30; D01F 8/06; D01F 11/06; D02G 3/36; D06P 5/22; D06P 1/65131; D06P 3/54; D06P 3/522; D06M 13/02; D06M 13/12; D06M 13/123; D06M 13/137; D06M 101/00; D06M 101/16; D06M 101/18; D06M 15/333; D06N 3/04; Y10T 428/2931; Y10T 428/2973; Y10T 428/2913; Y10T 428/2929; Y10T 428/2924; B32B 37/06; B32B 27/12
USPC ....... 428/394, 373, 374, 397, 370, 364, 221; 528/307, 302, 295, 272, 308.6; 8/115.56, 8/636

See application file for complete search history.

(56) References Cited

U.S. PATENT DOCUMENTS

| | | | | |
|---|---|---|---|---|
| 5,766,758 | A | * | 6/1998 | Hirakawa et al. ............ 428/364 |
| 6,139,954 | A | * | 10/2000 | Dean ....................... C08G 63/83 428/221 |
| 2003/0045673 | A1 | * | 3/2003 | Nakajima ............... C08G 63/84 528/282 |
| 2004/0038028 | A1 | | 2/2004 | Tanaka et al. |
| 2012/0260436 | A1 | | 10/2012 | Oka et al. |

FOREIGN PATENT DOCUMENTS

| | | | |
|---|---|---|---|
| JP | 6 184820 | | 7/1994 |
| JP | 7 189036 | | 7/1995 |
| JP | 10 158926 | | 6/1998 |
| JP | 11 93020 | | 4/1999 |
| JP | 2000 355831 | | 12/2000 |
| JP | 2003 64531 | | 3/2003 |
| JP | 2003064531 A | * | 3/2003 |
| JP | 2003 301328 | | 10/2003 |

* cited by examiner

[Fig. 1]
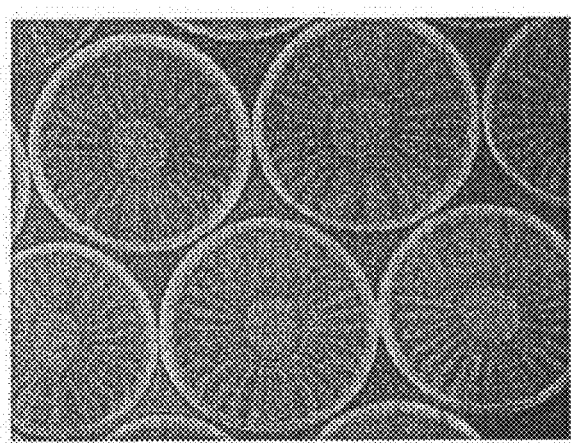
[Fig. 2]
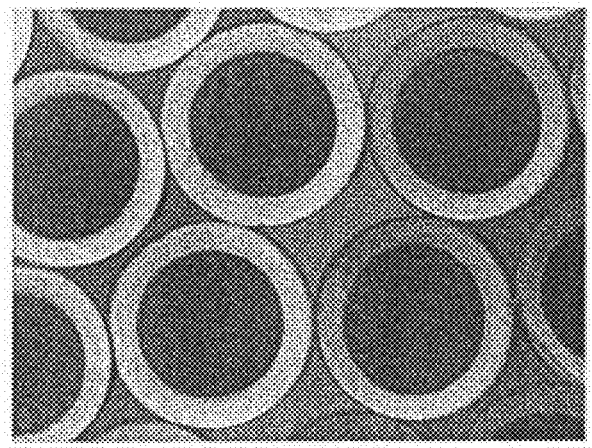
[Fig. 3]
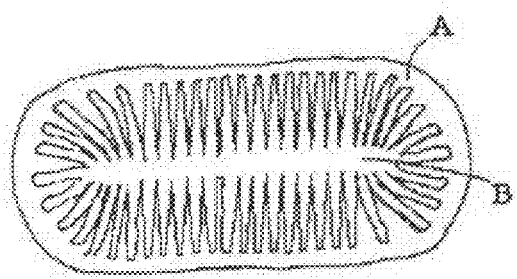

CATIONIC-DYEABLE POLYESTER FIBER AND CONJUGATED FIBER

TECHNICAL FIELD

The present invention relates to a polyester fiber and a conjugated fiber. More specifically, the invention relates to a polyester fiber having excellent properties in deep color property and fastness property when dying the fiber under a normal pressure environment.

BACKGROUND ART

Polyester fibers are used in various fields typified by clothing applications because of their properties such as mechanical properties, color development, and handling. However, polyester fibers are generally inferior in dyeability because of their dense fiber structure and when cation dyes and disperse dyes are used, it is difficult to obtain good color development and fastness property unless such fibers are put under high temperature of 130° C. and high pressure or a carrier of an organic solvent is used.

On the other hand, there has been demanded a technology for producing a polyester mixed product having good dyeing properties by mix-knitting or mix-weaving a polyester fiber with a material other than polyester, such as wool, cotton, acrylics and polyurethane, without using complicated steps; in this case, in order to provide sufficient dyeing properties to a polyester fiber, dyeing processing under high temperature of about 130° C. and high pressure is needed. However, since the material mix-knitted or mix-woven with the polyester fiber is degraded under the environment, there have been required development of a polyester fiber having good dyeing properties even under, for example, a normal pressure environment, more specifically, under 100° C. or lower.

For this reason, methods of improving dyeability through modification of a polyester resin have been studied in large numbers. Above all, there are many proposals to produce a polyester fiber easily dyeable with cation dyes and disperse dyes under normal pressure by copolymerizing a metal sulfonate group as a dicarboxylic acid component (see, for example, Patent Documents 1 to 4). Substances commonly used as a dicarboxylic acid having a metal sulfonate group include a 5-sodium sulfoisophthalic acid component, a 5-potassium sulfoisophthalic acid component, and the like. For example, Patent Documents 2 and 4 disclose a polyester fiber in which a 5-sodium sulfoisophthalic acid component and an adipic acid component are copolymerized. It has been reported that by processing such a copolymerized polyester into a fiber, it allows a fiber internal structure to hold amorphous parts well in comparison with conventional polyester fibers. And, it has been reported that, as a result, a polyester fiber can be obtained which is capable of being normal pressure dyed with disperse dyes and cation dyes and superior in fastness. However, fibers prepared by copolymerizing dicarboxylic acids having a metal sulfonate group are insufficient in dyeability under normal pressure.

Moreover, Patent Document 5 discloses a polyester-based conjugated fiber including a polyester A, as a core component, containing ethylene terephthalate units as main repeating units and a polyester B, as a sheath component, containing ethylene terephthalate units as main repeating units and obtained by being copolymerized with 5 to 30 mol % of cyclohexanedicarboxylic acid, wherein the glass transition temperature of the polyester B is lower than the glass transition temperature of the polyester A. Polyester-based conjugated fibers obtained in such a way are reported to be superior in dyeability and deep color property. However, the dyeability under a normal pressure environment may be insufficient in some cases and therefore improvement has been desired.

Moreover, fiber structures, such as woven fabric, knitted fabric and nonwoven fabric, made of a synthetic fiber, for example, a filament of polyester or polyamide are heretofore colder and more monotonous in feeling and gloss as compared with natural fibers such as cotton and hemp and therefore are low in quality as fiber structure because their monofilament fineness or cross-sectional shape of the constituent filament is monotonous. In addition, since polyester fibers are hydrophobic, there is a defect of being inferior in the water absorptivity and hygroscopicity of the fibers themselves. In order to improve these defects, various studies have been made. Out of them, there has been made, for example, an attempt to impart such performance as hydrophilicity to a hydrophobic fiber by conjugately spinning a hydrophobic polymer such as polyester and a polymer having a hydroxy group. Specifically, conjugated fibers made of an ethylene-vinyl alcohol-based copolymer and a hydrophobic thermoplastic resin, such as polyester, polyolefin, and polyamide, are disclosed (see, for example, Patent Documents 6 and 7).

Conjugated fibers made of an ethylene-vinyl alcohol-based copolymer and a polyester have a defect that the constituent polymers are prone to peeling because of low adhesion at the interface between the polymers. In order to improve this defect, various studies have been made. Out of them, there is disclosed a conjugated fiber superior in the interfacial peeling resistance in which projections are formed at the interface between the conjugated components as observed in the photograph of a cross-section of the fiber of FIG. 1 or 3 (see, for example, Patent Document 8).

However, conjugated fibers made of an ethylene-vinyl alcohol-based copolymer and a polyester have a defect that they are poor in heat stability against high temperature hot water and steam because of the low melting point or softening point of the ethylene-vinyl alcohol-based copolymer. For this reason, the conjugated fiber allows the ethylene-vinyl alcohol-based copolymer exposed on the surface of a fiber product, such as a woven fabric, a knitted fabric, and a non-woven fabric, to partly soften or slightly conglutinate by high-temperature, high-pressure dyeing or the use of a steam iron, so that the feeling becomes hard as a fiber product. In order to prevent this, there has been disclosed a method in which hydroxyl groups of the copolymer are acetalized using a dialdehyde compound or the like before bringing the fiber into contact with high-temperature hot water during dyeing or the like. However, the acetalization treatment causes a problem of increase in processing cost because it needs since this acetalization treatment needs an acetalization step in addition to the current dyeing step. Moreover, a problem regarding the corrosion resistance of a treating apparatus also arises due to the use of a strong acid in a high concentration in the acetalization treatment. Furthermore, a problem of difficulty in increasing color depth also arises because dyes are less prone to diffuse into the inside of the fiber acetalized. In addition, there also arises a problem of discoloration or the like of a dyed material caused by unreacted dialdehyde compounds in the acetalization treatment. Therefore, there were problems with the securement of the uniformity of fiber performance. Moreover, it is difficult to determine what type of dialdehyde compound and what degree of acetalization to be used for industrial practice of acetalization treatment depending upon the type of the compound and the degree of acetalization for the treatment. Therefore, it was a technology lacking stability for practical use. In other words, color difference occurs in dyed materials depending upon the degree of crosslinking, so that stable feeling failed to be obtained and only products with very low commercial value were obtained.

PRIOR ART DOCUMENTS

Patent Documents

Patent Document 1: JP 6-184820 A
Patent Document 2: JP 2000-355831 A
Patent Document 3: JP 2003-301328 A
Patent Document 4: JP 11-93020 A
Patent Document 5: JP 7-189036 A
Patent Document 6: JP 3-174015 A
Patent Document 7: JP 10-158926 A
Patent Document 8: JP 2003-64531 A

SUMMARY OF THE INVENTION

Problem to be Solved by the Invention

The present invention solves the problems associated with such conventional technologies and an object thereof is to provide a polyester fiber and a conjugated fiber that exhibit deep color property to cation dyes and disperse dyes under a normal pressure environment and is superior in color fastness to washing and color fastness to light and which can secure good dyeability and yarn quality for combined filament yarns with a material other than polyester fibers which require normal pressure dyeing.

Means for Solving the Problems

The aforementioned problem is solved by providing a fiber made of a polyester copolymer (B), wherein the polyester copolymer (B) comprises a dicarboxylic acid component and a glycol component, the dicarboxylic acid component comprises 75 mol % or more of a terephthalic acid component, 1.0 mol % to 3.5 mol % of component (a) derived from a compound represented by the following formula (I), 2.0 mol % to 10.0 mol % of a cyclohexane dicarboxylic acid component (b), and 2.0 mol % to 8.0 mol % of an aliphatic dicarboxylic acid component (c).

[Chemical Formula 1]

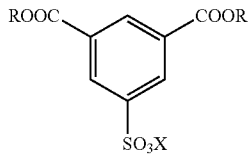
(I)

wherein in formula (I), R represents hydrogen, an alkyl group having 1 to 10 carbon atoms, or a 2-hydroxyethyl group, and X represents a metal ion, a quaternary phosphonium ion, or a quaternary ammonium ion.

Moreover, it is solved also by providing a conjugated fiber made of a polyester copolymer (B) and an ethylene-vinyl alcohol-based copolymer (A) having an ethylene content of 25 to 60 mol %, wherein the polyester copolymer (B) comprises a dicarboxylic acid component and a glycol component, the dicarboxylic acid component comprises 75 mol % or more of a terephthalic acid component, 1.0 mol % to 3.5 mol % of component (a) derived from a compound represented by the formula (I) given above, 2.0 mol % to 10.0 mol % of a cyclohexane dicarboxylic acid component (b), and 2.0 mol % to 8.0 mol % of an aliphatic dicarboxylic acid component (c), and the ethylene-vinyl alcohol-based copolymer (A) is exposed on at least a portion of the surface of the conjugated fiber.

It is preferable that the polyester copolymer (B) has four or more projections at the interface with the ethylene-vinyl alcohol-based copolymer (A) in a cross sectional configuration of the conjugated fiber, the major axis of each of the projections has an angle of 90°±15° with respect to the cross sectional circumference of the fiber, and the ratio of the circumferential length (L2) of the polyester copolymer (B) to the circumferential length (L1) of the conjugated fiber satisfies the following formula (1), $$1.6 \leq X/C \tag{1}$$

wherein X is the ratio (L2/L1) of the circumferential length of the polyester copolymer (B) to the circumferential length of the conjugated fiber, and
C is the mass conjugation ratio of the polyester copolymer (B) where the whole conjugated fiber is taken as 1.

Moreover, it is also preferable that the polyester copolymer (B) has ten or more projections at the interface with the ethylene-vinyl alcohol-based copolymer (A) in a cross sectional configuration of the conjugated fiber, and the intervals between neighboring projections are 1.5 μm or less. It is also preferable that the mass conjugation ratio of the ethylene-vinyl alcohol-based copolymer (A) to the polyester copolymer (B) is from 10:90 to 90:10.

Effect of the Invention

According to the present invention, there can be obtained a polyester fiber and a conjugated fiber with good dyeability under normal pressure in the use of a cation dye or a disperse dye. The polyester fiber and the conjugated fiber obtained according to the present invention are excellent in color fastness to washing and color fastness to light.

BRIEF DESCRIPTION OF THE DRAWINGS

FIG. 1 is a cross-sectional photograph showing one example of the conjugate cross-sectional shape of the conjugated fiber of the present invention.
FIG. 2 is a cross-sectional photograph showing another example of the conjugate cross-sectional shape (concentrical) of the conjugated fiber of the present invention.
FIG. 3 is a cross-sectional photograph showing another example of the conjugate cross-sectional shape of the conjugated fiber of the present invention.

MODE FOR CARRYING OUT THE INVENTION

Hereafter, modes for carrying out the present invention are described specifically.
The present invention relates to a fiber made of a polyester resin. The polyester resin is a polyester copolymer (B) composed of dicarboxylic acid components and glycol components. The polyester resin to be used in the present invention is a polyester including ethylene terephthalate units as main repeating units, wherein out of the dicarboxylic acid components, 75 mol % or more of repeating units are of a terephthalic acid component and at least three copolymerization components are included in addition to the terephthalic acid component.

It is important for the polyester resin in the present invention that three components of component (a) derived from a compound represented by the following formula (I), cyclohexane dicarboxylic acid component (b), and aliphatic dicarboxylic acid component (c) have been copolymerized in addition to a terephthalic acid component out of the dicarboxylic acid components. Although the cause is not clear, superior degree of exhaustion under normal pressure, color fastness to washing, and color fastness to light are secured well due to the presence of these three types of dicarboxylic acid components, and stable high-speed stringiness can be obtained even when a yarn is produced by a high-speed spinning technique without stretching.

[Chemical Formula 2]

(I)

wherein in formula (I), R represents hydrogen, an alkyl group having 1 to 10 carbon atoms, or a 2-hydroxyethyl group, and X represents a metal ion, a quaternary phosphonium ion, or a quaternary ammonium ion.

In order to acquire dyeability with a cation dye, the polyester resin in the present invention contains 1.0 mol % to 3.5 mol % of the component (a) derived from a compound represented by the above chemical formula (I) as a copolymerization component out of the dicarboxylic acid components.

Examples of the component (a) derived from the compound represented by the above formula (I) include dicarboxylic acid components having an alkali metal sulfonate group, such as 5-sodium sulfoisophthalic acid, 5-potassium sulfoisophthalic acid, and 5-lithium sulfoisophthalic acid; and 5-tetraalkylphosphonium sulfoisophthalic acid components, such as 5-tetrabutylphosphonium sulfoisophthalic acid and 5-ethyltributylphosphonium sulfoisophthalic acid. As to the component (a) derived from a compound represented by the above formula (I), only a single member thereof may be copolymerized in the polyester, or alternatively two or more members thereof may be copolymerized. A fiber internal structure can be made to hold an amorphous part better as compared with conventional polyester fibers by copolymerizing the component (a) derived from a compound represented by the above formula (I). As a result, a polyester fiber can be obtained which is capable of being normal pressure dyed with disperse dyes and cation dyes and superior in fastness.

When the amount of copolymerization of the component (a) of a compound represented by the above formula (I) is less than 1.0 mol % out of the dicarboxylic acid components, it is impossible to obtain a polyester dyeable with a cation dye which can be dyed into a clear good color tone when being dyed with a cation dye. On the other hand, if the amount of copolymerization of the component (a) derived from the compound represented by the above formula (I) exceeds 3.5 mol %, the viscosity of the polyester becomes so high that it becomes difficult to spin the polyester into a fiber. Moreover, the increase in the number of dye sites for the cation dye results in an excessive amount of dyeing of the cation dye, rather leading to the loss of the clearness of color tone. In terms of the clearness and the spinnability of the dyed material, the amount of copolymerization of the component (a) derived from the compound represented by the above formula (I) is preferably 1.2 to 3.0 mol %, more preferably 1.5 to 2.5 mol %.

In the case where a cyclohexanedicarboxylic acid component (b) is copolymerized with a polyethylene terephthalate, a fiber that is superior in color fastness to light while securing a high degree of exhaustion can be obtained because of a feature that disorder of crystal structure is small. The cyclohexanedicarboxylic acid component (b) can be introduced into the polyester by copolymerizing cyclohexanedicarboxylic acid or its ester-forming derivative.

The copolymerization of the cyclohexanedicarboxylic acid component (b) causes disorder in the crystal structure of the polyester fiber, so that the orientation of amorphous parts lowers. Accordingly, it becomes easy for cation dyes and disperse dyes to penetrate into the internal part of the fiber, so that it is possible to increase the normal pressure dyeability of the cation dyes and the disperse dyes. Moreover, since the cyclohexanedicarboxylic acid component (b) exhibits small disorder in crystal structure in comparison with other aliphatic dicarboxylic acid components, the polyester fiber superior also in color fastness to light is obtained.

In the polyester resin in the present invention, the amount of copolymerization of the cyclohexanedicarboxylic acid component (b) is 2.0 to 10.0 mol %, preferably 5.0 to 10.0 mol % out of the dicarboxylic acid components. When the amount of copolymerization of the cyclohexanedicarboxylic acid component (b) is less than 2.0 mol % of the dicarboxylic acid components, the degree of orientation of amorphous parts in the internal part of the fiber increases, so that the dyeability under a normal pressure environment becomes insufficient and a desired degree of exhaustion is not be obtained. On the other hand, if the amount of copolymerization of the cyclohexanedicarboxylic acid component (b) exceeds 10.0 mol % of the dicarboxylic acid components, good quality can be secured with respect to dyeability, such as degree of exhaustion, color fastness to washing, or color fastness to light. However, when a yarn is produced by a high-speed spinning technique without stretching, spontaneous extension occurs during high-speed winding because of the low glass transition temperature of a resin and a low degree of orientation of amorphous parts in internal parts of a fiber, so that stable high-speed stringiness cannot be obtained and stable fiber properties cannot be obtained.

The cyclohexanedicarboxylic acid to be used for the present invention includes three positional isomers, namely, 1,2-cyclohexanedicarboxylic acid, 1,3-cyclohexanedicarboxylic acid, and 1,4-cyclohexanedicarboxylic acid. Any one positional isomer may be copolymerized or alternatively a plurality of positional isomers may be copolymerized from the viewpoint of obtaining the effect of the present invention. Although each positional isomer has cis/trans isomers, any stereoisomer may be copolymerized or alternatively both cis/trans isomers may be copolymerized. The same applies for cyclohexanedicarboxylic acid derivatives.

Like the cyclohexanedicarboxylic acid component (b), an aliphatic dicarboxylic acid component (c) also causes disorder in the crystal structure of a polyester fiber and lowers the orientation of amorphous parts, so that it becomes easy for cation dyes and disperse dyes to penetrate into the internal part of the fiber and, as a result, it is possible to increase the normal pressure dyeability of the cation dyes and the disperse dyes. The aliphatic dicarboxylic acid component (c) can be introduced into the polyester by copolymerizing an aliphatic dicarboxylic acid or its ester-forming derivative.

Specifically, the copolymerization of the aliphatic dicarboxylic acid component (c) in a polyethylene terephthalate in an amount of 2.0 to 8.0 mol % has an effect also on low-temperature settability. Therefore, when the fiber obtained according to the present invention is processed into a woven or knitted fabric and then subjected to thermal setting for form-stabilization, a lower thermal setting temperature is allowed. Low-temperature settability is a preferable physical property in knitting applications; when combining the polyester fiber of the present invention with materials other than polyester, such as wool, cotton, acrylics, and polyurethane, it is possible to control the temperature necessary for thermal setting so that the physical properties of the materials other than polyester may not be deteriorated. Also in sole use of a polyester fiber, it is possible to adapt the fiber to general existing facilities for knitting and expansion of applications can be expected.

As to the polyester resin in the present invention, the amount of copolymerization of the aliphatic dicarboxylic acid component (c) is 2.0 to 8.0 mol %, preferably 2.5 to 7.0 mol %, and more preferably 3.0 to 6.0 mol % out of the dicarboxylic acid components. If the amount of copolymerization of the aliphatic dicarboxylic acid component (c) out of the dicarboxylic acid components is less than 2.0 mol %, dyeability to disperse dyes under a normal pressure environment becomes insufficient, so that a desired degree of exhaustion cannot be obtained. If the amount of copolymerization of the aliphatic dicarboxylic acid component (c), especially an adipic acid component, exceeds 8.0 mol % out of the dicarboxylic acid components, then the degree of exhaustion becomes high, but the degree of orientation of amorphous parts in the inside of a fiber becomes low when having conducted filature by a high speed spinning process without drawing. Therefore, it is impossible to obtain a stable high-speed spinnability due to remarkable spontaneous elongation in high speed winding, so that it is impossible to achieve stable fiber properties.

Examples of the aliphatic dicarboxylic acid component (c) to be used preferably include aliphatic dicarboxylic acid components such as an adipic acid component, a sebacic acid component, and a decane dicarboxylic acid component. These may be singly or alternatively two or more of them may be used in combination.

As long as the normal pressure dyeability or quality of the polyester fiber in the present invention is not impaired, dicarboxylic acid components other than the terephthalic acid component, the cyclohexanedicarboxylic acid component, and the aliphatic dicarboxylic acid component may be copolymerized. Specifically, aromatic dicarboxylic acid components, such as an isophthalic acid component and a naphthalene dicarboxylic acid component, may be used singly or in combination of two or more of them within the range up to 10.0 mol % in total may be copolymerized.

However, copolymerization of such components may not only complicate a transesterification reaction and a polycondensation reaction, but also may lower color fastness to washing if the amount copolymerized exceeds an appropriate range. Specifically, if an isophthalic acid component is copolymerized in an amount exceeding 10 mol % relative to the dicarboxylic acid component, even if the configuration requirement of the present invention is satisfied, color fastness to washing may lower; therefore it is preferable to use the isophthalic acid component in an amount of 5 mol % or less, and more preferably 0 mol % (in other words, not copolymerized).

Moreover, in the polyester fiber of the present invention, matting agents such as titanium oxide, barium sulfate, and zinc sulfide, heat stabilizers such as phosphoric acid and phosphorous acid, or light stabilizers, antioxidants, and surface treating agents such as silicon oxide, and the like may be contained as additives. Because of the use of silicon oxide, the resulting fiber can be provided with fine irregularities on its surface after weight loss processing and therefore deep color will be realized when being processed into a woven and knitted fabric later. Moreover, the use of a heat stabilizer can suppress thermal decomposition in heat melting or following heat treatment. Furthermore, the use of a light stabilizer can enhance the light resistance of a fiber in its use, whereas the use of a surface treating agent can also enhance dyeability.

Such additives may be added in advance to a polymerization system when a polyester resin is obtained by polymerization. Generally, however, addition in a late stage of polymerization is preferred for antioxidants and the like, and addition in such a manner is preferred particularly in the case where the polymerization system is adversely influenced or in the case where the additive is deactivated under polymerization conditions. On the other hand, addition during polymerization is preferred for matting agents, heat stabilizers and the like because they are thereby easily dispersed uniformly in a resin polymer.

The polyester resin in the present invention preferably has an intrinsic viscosity of 0.55 to 0.7, more preferably 0.58 to 0.68, and even more preferably 0.60 to 0.65. When the intrinsic viscosity exceeds 0.7, the high-speed spinnability in fiber formation becomes very poor. Moreover, even if it is possible to perform spinning and a desired degree of exhaustion is achieved, uneven dyeing or streaks will occur in tubular knitted dyed fabrics or feeling of woven and knitted fabrics will become poor, so that surface quality of the resulting woven and knitted fibers will deteriorate and therefore such fabrics are undesirable for clothing applications. When the intrinsic viscosity is less than 0.55, yarns become easy to break during spinning, resulting in decrease in productivity, and the strength of the resulting fibers will also decrease. Moreover, even if it is possible to perform spinning and a desired degree of exhaustion is achieved, uneven dyeing or streaks will occur in tubular knitted dyed fabrics or feeling of woven and knitted fabrics will become poor, so that surface quality of the resulting woven and knitted fibers will deteriorate and therefore such fabrics are undesirable for clothing applications.

In the spinning step in the method for producing a polyester fiber of the present invention, a polyester resin is spun through a spinneret by using a usual melt spinning apparatus. The cross-sectional shape or the diameter of a fiber to be obtained can be set arbitrarily by the shape or size of the spinneret.

Subsequently, the polyester resin in the present invention is melt-kneaded by using, for example, a single screw extruder or a twin screw extruder. The temperature used in melt-kneading may vary depending upon the amounts of copolymerization of the component derived from the compound represented by the above formula (I), the cyclohexanedicarboxylic acid component (b), and the aliphatic dicarboxylic acid component (c); however, in order to perform melt-kneading stably without unevenness and obtain stable yarn producing properties and quality, it is preferred to melt within a temperature range of from 30 to 60° C. higher than the melting point of the polymer and it is more preferred to melt within a temperature range of 20 to 50° C. higher than the melting point of the polymer. Moreover, the melting temperature used from passing through the kneading facility to reaching the spinning head cannot be specified generally because it may vary depending upon the amounts of copolymerization of the component derived from the compound represented by the above formula (I), the cyclohexanedicarboxylic acid component (b), and the aliphatic dicarboxylic acid component (c); however, in order to spin out the resin in a stable state without occurrence of melting unevenness and obtain stable yarn producing properties and quality, it is preferred to melt within a temperature range of from 30 to 60° C. higher than the melting point of the polymer and it is more preferred to melt within a temperature range of 20 to 50° C. higher than the melting point of the polymer.

Then, the polyester fiber melt-spun by the above-described procedure is cooled once to its glass transition temperature or lower, preferably to a temperature that is at least 10° C. lower than the glass transition temperature. The cooling method and the cooling apparatus to be used in this case may be any method and any apparatus capable of cooling the spun polyester fiber to its glass transition temperature or lower and are not particularly limited. It is preferred to provide a cooling wind blowing apparatus such as a cooling wind blowing pipe, under the spinneret and blow cooling wind to a polyester fiber having been spun out, thereby cooling the fiber to its glass transition temperature or lower. In such a case, cooling conditions such as the temperature and humidity of the cooling wind, the blowing rate of the cooling wind, and the angle at which the cooling wind is blown to the spun thread are not particularly limited, and any conditions may be permitted as long as the polyester fiber having been spun out from the spinneret can be cooled rapidly and uniformly to the glass transition temperature or lower while being prevented from swaying of the fiber. Especially, from the viewpoint of smoothly obtaining a polyester fiber of high quality, it is preferred to adjust the temperature of the cooling wind to 20 to 30° C., the humidity of the cooling wind to 20 to 60%, the rate of blowing the cooling wind to 0.4 to 1.0 m/second, and perform the cooling of a spun polyester fiber with the direction of blowing the cooling wind being perpendicular with respect to the spun fiber. When cooling is performed under the above-described conditions by using a cooling wind blowing pipe, it is preferred to arrange the cooling wind blowing pipe having a length of about 80 to about 120 cm, immediately below the spinneret with a slight gap or with no gap.

Next, as a method for obtaining a stretched yarn of stable quality with more efficient productivity, a stretched yarn can be obtained by cooling a thread once to its glass transition temperature or lower after its spinning, then subjecting the thread to a heat-stretching treatment by successively running the thread directly within a heating section, specifically such an apparatus as a tube type heating apparatus, and winding the thread at a rate of 3500 to 5500 mL/min after the oil providing. The heating temperature in the heating step is required to be a temperature at which stretching is attained easily, that is, a temperature of the glass transition temperature or higher and the melting point or lower, and specifically, it is preferably at least 30° C., and more preferably at least 50° C. higher than the glass transition temperature. In addition, it is preferably at least 20° C., and more preferably at least 30° C. lower than the melting point. According to the above description, the thread cooled to the glass transition temperature or lower in the cooling step is heated in the heating apparatus and thereby molecular motion is promoted and activated, so that a stretched yarn can be obtained.

It is preferred to provide an oil after passing the yarn through the stretching treatment step by the heating apparatus. This makes yarn breakage in stretching small. As the oil, any oil usually used for spinning of polyester can be used without any limitation. As the method of providing the oil, any of oiling nozzle oil providing by a gear pump system or oiling roller oil providing can be used. It is noted that the former system tends to be able to achieve oil attachment evenly and stably to yarns with an increase in spinning rate. The amount of the oil attached is not particularly limited and it may be adjusted appropriately as long as it is within a range suitable for an effect to suppress yarn breakage or fluff of raw yarns and a step of woven and knitted fabrics. Especially, it is preferred to adjust the amount of the oil attached to 0.3 to 2.0% because polyester fibers of high quality can be obtained smoothly and it is more preferred to adjust the amount to 0.3 to 1.0%.

And, it is preferred to haul the drawn polyester fiber acquired as a result of the above-described series of steps at a rate of 3500 to 5500 m/min, and it is more preferred to haul it at a rate of 4000 to 5000 m/min. If the rate of hauling the polyester fiber is less than 3500 m/min, the productivity will decrease and stretching of the fiber will not be carried out sufficiently in the heating section, so that the mechanical properties of the resulting polyester fiber may deteriorate. If the rate of hauling the polyester fiber exceeds 5500 m/min, stable high-speed spinnability is difficult to be achieved and stretching of the fiber will not be carried out sufficiently in the heating section, so that the mechanical properties of the resulting polyester fiber may deteriorate.

As to the degree of exhaustion with cation dyes and disperse dyes of the polyester fiber to be obtained in the present invention, it is preferred that the degree of exhaustion at 90° C. be 80% or higher and the degree of exhaustion at 95° C. be 85% or higher. When dropping below such degrees of exhaustion, such fibers are undesirable for general clothing applications because sufficient degree of exhaustion cannot be obtained by using dyes by which a fiber can be easily dyed, such as medium or low molecular weight dyes (SE to E types). Moreover, even if being mix-knitted or mix-woven with a material other than polyester, such as wool, cotton, acrylics, and polyurethane, it may become difficult to obtain sufficient dyeability under a normal pressure environment.

It is preferred for the polyester fiber obtained by the present invention that the color fastness to washing of discoloration, that of attachment staining, and that of liquid staining are grade 4 or higher. If any of the color fastness to washing of discoloration, that of attachment staining, and that of liquid staining is grade 3 or lower, such a fiber is undesirable for general clothing applications from the viewpoint of handling.

The polyester fiber obtained by the present invention preferably has a color fastness to light of grade 4 or higher. When the color fastness to light is grade 3 or lower, the fiber is undesirable for general clothing applications from the viewpoint of handling.

As to the method for producing the polyester fiber of the present invention, the fiber is not limited to stretched yarns produced by the above-described production method, and an optimum spinning method may be chosen in order to secure quality to be required in final products or good process passability. More specifically, there can also be adopted a spin draw system or a 2-Step system in which an original spun yarn is taken and then it is stretched in a separate step.

Moreover, also in a system in which an unstretched yarn is wound as it is at a hauling rate of 2000 m/min or more without stretching the unstretched yarn, a polyester product with good normal pressure dyeability quality can be obtained by passing the yarn through arbitrary yarn processing steps and then finishing the resultant as a product.

According to the present invention, a polyester fiber can be provided which can be dyed with excellent deep color property and fastness property in dyeing under a normal pressure environment and which can offer stable quality and processing performance also by a direct spinning stretching method or other general melt-spinning methods. Moreover, good dyeability and yarn quality can be secured for combined filament yarns with a material other than polyester fibers which require normal pressure dyeability. Specifically, since the normal pressure dyeable polyester fiber of the present invention has no inferior quality comparable to that of conventional polyester fibers, it can be used effectively for a wide range of general clothing, such as men's and women's formal or casual clothing applications, sports applications, and uniforms applications. Furthermore, it can be also used effectively for general material applications including interior material applications for automobiles, aircrafts, and the like; living material applications such as shoes and bags; industrial material applications such as curtains and carpets; and the like.

Another embodiment of the present invention is a conjugated fiber composed of an ethylene-vinyl alcohol-based copolymer (A) having an ethylene content of 25 to 60 mol % and the polyester copolymer (B) described above. That is, the invention is a conjugated fiber made of a polyester copolymer (B) and an ethylene-vinyl alcohol-based copolymer (A) having an ethylene content of 25 to 60 mol %, wherein the polyester copolymer (B) comprises a dicarboxylic acid component and a glycol component, the dicarboxylic acid component comprises 75 mol % or more of a terephthalic acid component, 1.0 mol % to 3.5 mol % of component (a) derived from a compound represented by the above formula (I), 2.0 mol % to 10.0 mol % of a cyclohexane dicarboxylic acid component (b), and 2.0 mol % to 8.0 mol % of an aliphatic dicarboxylic acid component (c), and the ethylene-vinyl alcohol-based copolymer (A) is exposed on at least a portion of the surface of the conjugated fiber.

First, the ethylene-vinyl alcohol-based copolymer (A) in the above-mentioned conjugated fiber will be explained. Although the ethylene-vinyl alcohol-based copolymer (A) is obtained by saponifying an ethylene-vinyl acetate copolymer, one having a degree of saponification of 95% or more is preferable. Preferred is one having an ethylene copolymer proportion of 25 to 60 mol %, in other words, one having a vinyl alcohol component (including an unsaponified vinyl acetate component) in an amount of about 40 to about 75 mol %. If the proportion of vinyl alcohol in the ethylene-vinyl alcohol-based copolymer (A) becomes lower, then characteristics such as hydrophilicity will deteriorate due to the decrease of hydroxyl groups, resulting in the probability that desired feeling resembling that of natural fiber with good hydrophilicity cannot be obtained. Conversely, if the proportion of the vinyl alcohol component becomes excessively large, then the melt-moldability will deteriorate and spinnability will become poor when conjugately spinning with the polyester copolymer (B), resulting in the probability that the fiber will be frequently broken or cut during spinning or drawing. Therefore, one having a high degree of saponification and an ethylene copolymer proportion of 25 to 60% is suitable for obtaining a fiber desired by the present invention.

In use of a high melting point polymer as the polyester copolymer (B) to be conjugated with the ethylene-vinyl alcohol-based copolymer (A), a preferable way for conducting spinning stably for a long time is to improve the heat resistance of the ethylene-vinyl alcohol-based copolymer (A) at the time of melt molding. As a measure therefor, setting the copolymerization ratio of ethylene to an appropriate range and further adjusting the metal ion content in the ethylene-vinyl alcohol-based copolymer (A) to a prescribed value or less are also effective.

As to the mechanism of the thermal decomposition of the ethylene-vinyl alcohol-based copolymer (A), it has been believed that the decomposition occurs roughly in the combination of the case that a crosslinking reaction occurs between backbone chains of the polymer to form gels and the mechanism in which decomposition such as the breakage of backbone chains and the detachment of side chains proceed. The removal of metal ions in the ethylene-vinyl alcohol-based copolymer (A) remarkably improves the thermal stability of the polymer exhibited in melt spinning. In particular, the adjustment of each of the content of Group I alkali metal ions such as $Na^+$ and $K^+$ ions and that of Group II alkaline earth metal ions such as $Ca^{2+}$ and $Mg^{2+}$ ions to 100 ppm or less has a remarkably effect. Especially in long-run melt spinning conducted at high temperatures, increasing generation of gels in the ethylene-vinyl alcohol-based copolymer (A) leads to gradual clogging and deposition on a spinning filter. As a result, the spinning pack pressure rapidly increases to shorten the nozzle life and, in addition, the fiber will be frequently broken or cut during spinning. Further advance of the deposition of the gels is undesirable because it will cause clogging of polymer lines, leading to the occurrence of failures. The removal of Group I alkali metal ions and Group II alkaline earth metal ions contained in the ethylene-vinyl alcohol-based copolymer (A) leads to a decreased probability that failures occur due to the generation of gels despite the execution of long continuous operation in melt-spinning at high temperatures, especially in melt-spinning at a temperature of 250° C. or higher. Each of the contents of these metal ions is preferably not more than 50 ppm and more preferably not more than 10 ppm.

One example of a method for producing the ethylene-vinyl alcohol-based copolymer (A) is described as follows. Ethylene and vinyl acetate are radically polymerized in the presence of a radical polymerization catalyst in a polymerization solvent, such as methanol. Then unreacted monomers are purged out and a saponification reaction is caused by sodium hydroxide, forming an ethylene-vinyl alcohol copolymer, which is then processed in water into pellets, which are then washed with water and dried. Accordingly, alkali metal and alkaline earth metal are prone to be contained in the polymer inevitably for process reasons, and in general, hundreds ppm or more of alkali metal and alkaline earth metal are contained.

In one method for reducing as much as possible the content of alkali metal ions and alkaline earth metal ions, during the process of producing the ethylene-vinyl alcohol-based copolymer (A), saponification treatment and pelletization are conducted, then the resulting wet pellets are washed with a large quantity of pure water containing acetic acid, and then the pellets are further washed with a large excess quantity of pure water alone. The ethylene-vinyl alcohol-based copolymer (A) is produced by saponifying a copolymer of ethylene and vinyl acetate with sodium hydroxide, and its degree of saponification is preferably adjusted to 95% or more as described previously. Decrease in the degree of saponification is undesirable because it will cause decrease in the crystallinity of the polymer and will lead to the deterioration in fiber properties such as strength, and also it will make the ethylene-vinyl alcohol-based copolymer (A) prone to be softened, so that failures will occur during a processing process and the feeling of a resulting fiber structure will deteriorate.

On the other hand, as described above, the polyester copolymer (B) in the conjugated fiber of the present invention is a polyester comprising ethylene terephthalate units as main repeating units, wherein out of the dicarboxylic acid components, 75 mol % or more repeating units are of a terephthalic acid component and at least three copolymerization components are included in addition to the terephthalic acid component.

The polyester copolymer (B) in the conjugated fiber of the present invention preferably has an intrinsic viscosity of 0.6 to 0.7, more preferably 0.62 to 0.68, and even more preferably 0.63 to 0.66. When the intrinsic viscosity exceeds 0.7, the high-speed spinnability in fiber formation becomes very poor. Moreover, even if it was possible to perform spinning and a desired degree of exhaustion was achieved, uneven dyeing or streaks will occur in tubular knitted dyed fabrics or feeling of woven and knitted fabrics will become poor, so that surface quality of the resulting woven and knitted fibers will deteriorate and therefore such fabrics are undesirable for clothing applications. When the intrinsic viscosity is less than 0.6, yarns are prone to break during spinning, resulting in decrease in productivity, and the strength of the resulting fibers will also decrease. Moreover, even if it was possible to perform spinning and a desired degree of exhaustion was achieved, uneven dyeing or streaks will occur in tubular knitted dyed fabrics or feeling of woven and knitted fabrics will become poor, so that surface quality of the resulting woven and knitted fibers will deteriorate and therefore such fabrics are undesirable for clothing applications.

The sectional shape of the conjugated fiber of the present invention is a form like that found in the photograph of a cross-section of the fiber of FIGS. 1 to 3, for example, and the polyester copolymer (B) forms 0 projections (concentrical) or one or more projections at the interface with the ethylene-vinyl alcohol-based copolymer (A). Resistance against the interfacial peeling between the conjugated components can be obtained sufficiently by forming a state in which preferably 4 or more, more preferably 10 or more projections are arranged. Moreover, a better deep colorability at the time of conducting dyeing can be achieved by adjusting the intervals between neighboring projections to 1.5 μm or less by forming an increased number of projections. Interfacial peeling resistance against external force that act from all directions can be obtained by arranging the projections as observed in FIG. 1.

In the present invention, it is preferable in the conjugate embodiment depicted in FIG. 1 or 3 that the intervals (I) between neighboring pleat-like projections are 1.5 μm or less. It is preferable that the major axis of each of the projections has an angle of 90°±15° with respect to the cross sectional circumference of the fiber. When the intervals (I) between neighboring projections exceed 1.5 μm, the deep colorability and the uniform dyeability at the time of conducting dyeing treatment may become insufficient. The case that projections are so arranged that their major axes extended toward the cross sectional circumference of the fiber meet the cross sectional circumference at an angle (R) of less than 75° or the case that projections are so arranged that the extended major axes meet the cross sectional circumference at an angle (R) of greater than 105° is undesirable because in such a case, interfacial peeling is readily caused by external force that acts on the fiber, leading to the occurrence of the whitening of a dyed article. From the above-mentioned points, the intervals (I) between neighboring projections are preferably 1.5 μm or less, and more preferably 1.2 μm in the invention. The interval (I) between neighboring projections as referred to herein indicates the mean distance between the tips of the neighboring projections; as long as the effect of the present invention is not damaged, parts having intervals of greater than 1.5 μm out of many intervals between projections and intervals of core components may exist partly in the fiber cross section. Also as to the above-mentioned angle, as long as the effect of the present invention is exerted, projections having an angle of less than 75° or greater than 105° may partly exist.

In the present invention, it is preferred that the ratio of the circumferential length (L2) of the polyester copolymer (B) to the circumferential length (L1) of the conjugated fiber satisfies the following formula (1), $$1.6 \leq X/C \tag{1}$$

X is the ratio (L2/L1) of the circumferential length of the polyester copolymer (B) to the circumferential length of the conjugated fiber, and C is the mass conjugation ratio of the polymer polyester (B) where the whole conjugated fiber is taken as 1.

Although the ratio X of the circumferential length (L2) of the polyester copolymer (B) to the circumferential length (L1) of the conjugated fiber varies depending on the conjugation ratio of the polyester copolymer (B), X/C is preferably 1.6 or more, more preferably 2.0 or more, even more preferably 2.5 or more, and particularly preferably 5 or more. For example, when the mass conjugation ratio of the polyester copolymer (B) to the ethylene-vinyl alcohol-based copolymer (A) is 50:50, the ratio of the circumferential length (L2) of the polyester copolymer (B) to the circumferential length (L1) of the conjugated fiber is preferably 0.8 or more, more preferably 1.0 or more, and even more preferably is 1.25 or more. When X/C is 1.6 or more, the effect of preventing interfacial peeling of the polyester copolymer (B) and the ethylene-vinyl alcohol-based copolymer (A) surprisingly increases. Although the action mechanism of the effect of preventing interfacial peeling in the invention is matter of much speculation at present, it is probably because of the synergism of the increase in the adhesion area of the conjugated components combined with the anchor effect of the projections formed by the polyester copolymer (B).

Although the conjugation ratio of the ethylene-vinyl alcohol-based copolymer (A) and the polyester copolymer (B) may be set appropriately depending upon the conjugate configuration and on the fiber sectional shape, it is preferably from 90:10 to 10:90 (mass ratio), and more preferably from 70:30 to 30:70. If the conjugation ratio of the ethylene-vinyl alcohol-based copolymer (A) is less than 10% by mass, characteristics of the fiber such as hydrophilicity, which is one of the characteristics of the fiber, will be lost due to decrease in the number of hydroxyl groups. On the other hand, a conjugated fiber having a conjugation ratio of the ethylene-vinyl alcohol-based copolymer (A) is over 90% by mass is undesirable because characteristics of the ethylene-vinyl alcohol-based copolymer is exerted and hydrophilicity and glossiness are satisfied sufficiently, and the fiber is inferior in fiber properties and color developing ability of a dyed article.

As to the cross-sectional shape of the conjugated fiber, the ethylene-vinyl alcohol-based copolymer (A) need not cover the whole fiber surface, but in order to possess a clear color developing ability, it is preferable that 80% or more, more preferably 90% or more of the fiber surface is covered with the ethylene-vinyl alcohol-based copolymer (A) with a low index of refraction. Especially, sheath-core type conjugated fibers having a concentrical sectional shape as depicted in FIG. 2 or a sectional shape as depicted in FIG. 1 or FIG. 3 are preferable in terms of clear color developing ability, fiber strength, etc.

Although a clear color developing ability can be obtained by the use of the polyester copolymer (B) for a conjugated fiber, when such a fiber is used for a sports wear application, the fiber is required to have not only a color developing ability but also gloss. In general, glossy fibers are poor in color developing ability, but it is difficult to impart gloss to fibers if precedence is given to the color developing ability. In the present invention, a fiber being superior in deep color property and having gloss can be obtained by designing the interfacial structure between the ethylene-vinyl alcohol-based copolymer (A) and the polyester copolymer (B) to be a projection arrangement as described above. In order to impart gloss, the more the number of flat faces on which light is reflected, the better, and cross sectional shapes having a mild degree of modification and a flat surface are more effective. For the cross section of this type, a triangular or flattened cross section is the best.

Although the thickness of the above-described conjugated fiber is not particularly limited and any thickness may be used, a preferable way to obtain a fiber superior in color developing ability, glossiness, and feeling is to adjust the monofilament fineness of the conjugated fiber to about 0.3 to about 11 dtex. Not only filament but also staple is expected to enjoy the advantages of the present invention.

The method for producing the conjugated fiber of the invention is not particularly restricted so long as it is a method by which a conjugated fiber that satisfies the requirements of the invention can be produced. A conjugate spinning apparatus is used, and a conjugated flow of an ethylene-vinyl alcohol-based copolymer (A) and a polyester copolymer (B) is led into an inlet of a nozzle. In this stage, the polyester copolymer (B) is made to flow through a distribution plate which has, on its circumference, pores of the same number as the projections of the polyester copolymer (B), and while the overall flow of the polyester copolymer (B) that flows through the respective pores is covered with the ethylene-vinyl alcohol-based copolymer (A), the resulting conjugate flow is led toward the center of the inlet of the nozzle, and this is melt-discharged through the spinning nozzle. Thus, the conjugated fiber can be obtained. Moreover, an optimum spinning/drawing method may be chosen in order to secure quality to be required in final products or good process passability. More specifically, there can also be adopted a spin draw system or a 2-Step system in which an original spun yarn is taken and then it is stretched in a separate step. Moreover, also in a system in which an unstretched yarn is wound as it is at a hauling rate of 2000 m/min or more without stretching the unstretched yarn, a conjugated fiber product with good normal pressure dyeability quality can be obtained by passing the yarn through arbitrary yarn processing steps and then finishing the resultant as a product.

In the spinning step in the method for producing the conjugated fiber of the present invention, the fiber may be spun out through a spinneret by using a usual melt spinning apparatus. The cross-sectional shape or the diameter of a fiber to be obtained can be set arbitrarily by the shape or size of the spinneret.

The conjugated fiber obtained by the present invention may be used as various fiber assemblies (fibrous structures). The fiber assemblies include not only woven or knitted fabrics or nonwoven fabrics made of only the fibers of the present invention but also woven or knitted fabrics or nonwoven fabrics partly comprising the fibers of the present invention, for example, woven or knitted union fabrics with any other fibers such as natural fibers, chemical fibers, and synthetic fibers, as well as knitted or woven fabrics of combined or blended yarn, or blended nonwoven fabrics. The ratio of the fibers of the present invention in the woven or knitted fabrics or the nonwoven fabrics is preferably not less than 10% by mass, more preferably not less than 30% by mass.

As to the principal use of the fibers of the present invention, filament may be used alone or partly to form woven or knitted fabrics, which are to be used as clothing materials having good feeling. On the other hand, staple may be for staple for clothing, and also for nonwoven fabrics by dry or wet process, and these are suitable not only for clothing but also for non-clothing applications such as for various living materials and industrial materials.

Also for the conjugated fiber to be obtained in the present invention, it is preferred that the degree of exhaustion at 90° C. be 80% or higher and the degree of exhaustion at 95° C. be 85% or higher. It is preferred for the conjugated fiber obtained by the present invention that the color fastness to washing of discoloration, that of attachment staining, and that of liquid staining are grade 4 or higher. The conjugated fiber obtained according to the present invention preferably has a color fastness to light of grade 4 or higher.

According to the present invention, it is possible to provide a conjugated fiber that has good feeling like natural fiber and is good in glossiness and hygroscopicity and that can be dyed with excellent deep color property and fastness property because it is possible to dye the fiber under a normal pressure environment. Moreover, it is possible to provide a conjugated fiber that can offer stable quality and processing performance also by a direct spinning stretching method or other general melt-spinning methods. Specifically, there is provided a conjugated fiber that exhibits deep color properties to cation dyes and disperse dyes and that is superior in color fastness to washing and color fastness to light at dyeing temperatures under normal pressure, i.e., 90° C. or lower, at which the ethylene-vinyl alcohol-based copolymer (A) exposed on a fiber surface will fail to partly soften or slightly conglutinate. Since such a conjugated fiber has quality comparable to that of conventional ethylene-vinyl alcohol copolymer-based conjugated fibers, it can be used effectively for a wide variety of applications, such as general clothing, such as men's and women's formal or casual clothing applications, sports applications, uniforms applications, and life material applications such as shoes and bags.

EXAMPLES

The polyester fiber of the present invention will be described in detail below with reference to Examples, however, they do not limit the invention. The amounts of copolymerization of dicarboxylic acid components and glycol components, the method of dyeing fibers, the degree of exhaustion, the dyeing concentration (K/S), the color fastness to washing, the color fastness to light, the fineness, and the spinnability were evaluated in accordance with the following methods.

<The Amounts of Copolymerization of a Dicarboxylic Acid and a Glycol Component>

The polyester fiber was dissolved in a deuterated trifluoroacetic acid solvent in a concentration of 0.5 g/L and then the amount of copolymerization thereof was measured by using a 500 MHz $^1$H-NMR apparatus (nuclear magnetic resonance apparatus LA-500 manufactured by JEOL Ltd.) at 50° C.

<Intrinsic Viscosity>

Intrinsic viscosity was measured by using an Ubbelohde's viscometer (model "HRK-3" manufactured by Hayashi Seisakusho Co., Ltd.) at 30° C. using a phenol/tetrachloroethane (volume ratio 1/1) mixed solvent as a solvent.

<Dyeing Method>

A tubular knitted fabric of a resulting fiber was refined and then dyed with a cation dye or a disperse dye under the following conditions.

(Cation Dyeing)
  Dye: Cathilon Red CD-FGLH 3.0% omf
  Assistant: Na$_2$SO$_4$ 10.0%, CH$_3$COONa 0.5%, CH$_3$COOH (50%)
  Bath ratio 1:50
  Dyeing temperature×time: 90° C.×40 minutes (Disperse Dyeing)
  Dye: Dianix NavyBlue SPH, conc. 5.0% omf
  Assistant: Disper TL: 1.0 cc/l, ULTRA MT-N2: 1.0 cc/l
  Bath ratio: 1/50
  Dyeing temperature×time: 95 to 100° C.×40 minutes (Reductive Washing)
  Sodium hydroxide: 1.0 g/L
  Sodium hydrosulfite: 1.0 g/L
  Amiladin D: 1.0 g/L
  Bath ratio: 1/50
  Reductive washing temperature×time: 80° C.×20 minutes <Degree of Exhaustion>

In the above dyeing method, an original liquid before dyeing and a residual liquid after dyeing were respectively diluted with acetone water (acetone/water=1/1 mixed solution) to an arbitrary identical factor, each followed by measurement of absorbance, and then a degree of exhaustion was calculated from the formula given below.

Absorbance analyzer: Spectrophotometer HITACHI HITACHI Model 100-40 Spectrophotometer $$\text{Degree of exhaustion} = (A-B)/A \times 100 (\%)$$

Here, A and B in the above formula represent the following, respectively.

A: Absorbance of original liquid (acetone water diluted solution)

B: Absorbance of dyeing residual liquid (acetone water diluted solution)

<Dyeing Concentration (K/S)>

A reflectance R at the maximum absorption wavelength of the sample knitted fabric was measured after the dyeing and then dyeing concentration (K/S) was calculated from the Kubelka-Munk formula given below.

Spectral reflectance analyzer: Spectrophotometer HITACHI C-2000S Color Analyzer $$K/S = (1-R)^2/2R$$

<Color Fastness to Washing>

Measurement was conducted in accordance with the measuring method provided in JIS L-0844 using a sample knit after the above-described dyeing.

<Color Fastness to Light>

Measurement was conducted in accordance with the measuring method provided in JIS L-0842 using a sample knit after the above-described dyeing.

<Fineness>

Fineness was measured in accordance with the measurement method of JIS L-1013.

<Spinnability>

Evaluation of spinnability was carried out in accordance with the following criteria.

A: Spinnability is very good, for example, no breakage of yarn occurred during spinning when spinning was carried out continuously for 24 hours and no fluff or loop occurred on the resulting polyester fiber.

B: Spinnability is almost good although breakage of yarn occurred in a frequency of once or less during spinning when spinning was carried out continuously for 24 hours, and no fluff or loop occurred on the resulting polyester fiber or slight fluff or loop occurred.

C: Spinnability is poor because breakage of yarn occurred more than once and up to three times during spinning when spinning was carried out continuously for 24 hours.

D: Spinnability is very poor because breakage of yarn occurred more than three times during spinning when spinning was carried out continuously for 24 hours.

Example 1

A polyester resin polymer having the composition given in Table 1 was obtained by conducting a transesterification reaction and a polycondensation reaction using a total carboxylic acid component containing 88.3 mol % of terephthalic acid (TA), 1.7 mol % of 5-sodiumsulfoisophthalic acid, 5.0 mol % of 1,4-cyclohexanedicarboxylic acid (CHDA), and 5.0 mol % of adipic acid out of all dicarboxylic acid components, ethylene glycol, and the prescribed additives. Threads were spun out based on this raw material at a spinning temperature of 260° C. and an output per hole of 1.57 g/min using a spinneret with 24 holes (hole diameter: 0.20 mmφ)). Subsequently, cooling wind with a temperature of 25° C. and a humidity of 60% was blown to the spun threads at a rate of 0.5 m/second, thereby cooling the threads to 60° C. or lower. Subsequently, the threads were introduced into a tube heater (internal temperature: 185° C.) provided at a position 1.2 m below the spinneret, having a length of 1.0 m, an inlet guide diameter of 8 mm, an outlet guide diameter of 10 mm, and an inner diameter of 30 mmφ and then were stretched within the tube heater. Subsequently, oil was provided to the threads discharged from the tube heater by using an oiling nozzle, followed by winding the threads via two haul-off rollers at a rate of 4500 m/min, so that polyester filaments of 84T/24f were obtained. The yarn formation conditions and the spinnability at that time and the dyeing fastness properties of the resulting fibers are shown in Tables 1 and 2. The degree of exhaustion of the obtained polyester fibers was 96% at 90° C. and 99% at 95° C. and exhibited very good normal temperature dyeability with a dyeing concentration (K/S) of 28. There were also no problems with their quality with respect to color fastness to washing and color fastness to light.

Examples 2 to 8

Copolymers were obtained in the same manner as Example 1 except for changing the copolymerization components and the amounts of copolymerization of the compound represented by the above chemical formula (I), 1,4-cyclohexanedicarboxylic acid, the aliphatic dicarboxylic acid, and isophthalic acid (IPA) of the polyester resin as shown in Table 1. Moreover, polyester filaments of 84T/24f were obtained by spinning the polymers in the same manner as in Example 1. Physical properties of the fibers obtained are shown in Tables 1 and 2. All were good in spinnability and normal pressure dyeability (degree of exhaustion, K/S, fastness property) and had quality with no problems.

Comparative Examples 1 to 6

Copolymers were obtained in the same manner as Example 1 except for changing the amounts of copolymerization of the compound represented by the above chemical formula (I), 1,4-cyclohexanedicarboxylic acid, and the aliphatic dicarboxylic acid of the polyester resin as shown in Table. Moreover, polyester filaments of 84T/24f were obtained by spinning the polymers in the same manner as in Example 1.

In Comparative Example 1, since no adipic acid component was copolymerized, the degree of exhaustion and the dyeing concentration were insufficient, resulting in failure to exhibit normal pressure dyeability.

In Comparative Example 2, since no 1,4-cyclohexanedicarboxylic acid component was copolymerized, the degree of exhaustion and the dyeing concentration were insufficient, resulting in failure to exhibit normal pressure dyeability.

In Comparative Example 3, the amount of copolymerization of the 5-sodium sulfoisophthalic acid component was large, resulting in poor spinnability.

In Comparative Example 4, since the amount of copolymerization of the 5-sodium sulfoisophthalic acid component was small, the degree of exhaustion and the dyeing concentration were insufficient, resulting in failure to exhibit normal pressure dyeability.

In Comparative Example 5, the amount of copolymerization of the 1,4-cyclohexanedicarboxylic acid component was adjusted to 15.0 mol %, thereby adjusting the amount of copolymerization of the terephthalic acid component to 78.3 mol %. As a result, the resulting fiber was poor in spinnability though they were sufficient in degree of exhaustion and dyeing concentration.

In Comparative Example 6, since the amount of copolymerization of the adipic acid component was large, spinnability was remarkably poor though the degree of exhaustion and the dyeing concentration were high enough.

TABLE 1

| | | Copolymerized species, the amount of copolymerization (mol %) | | | | | |
|---|---|---|---|---|---|---|---|
| | | (a) | | | | (c) Aliphatic dicarboxylic acid | |
| | TA | Kind | Amount | (b) CHDA | Kind | Amount | IPA |
| Example 1 | 88.3 | 5-Na sulfoisophthalic acid | 1.7 | 5.0 | Adipic acid | 5.0 | 0.0 |
| Example 2 | 87.5 | 5-Na sulfoisophthalic acid | 2.5 | 5.0 | Adipic acid | 5.0 | 0.0 |
| Example 3 | 87.5 | 5-Tetrabutylphosphoniumsulfoisophthalic acid | 2.5 | 5.0 | Adipic acid | 5.0 | 0.0 |
| Example 4 | 87.5 | Tetrabutylphosphonium 3,5-di(beta-hydroxyethoxycarbonyl)benzene sulfonate | 2.5 | 5.0 | Adipic acid | 5.0 | 0.0 |
| Example 5 | 87.3 | 5-Na sulfoisophthalic acid | 1.7 | 8.0 | Adipic acid | 3.0 | 0.0 |
| Example 6 | 87.3 | 5-Na sulfoisophthalic acid | 1.7 | 3.0 | Adipic acid | 8.0 | 0.0 |
| Example 7 | 88.3 | 5-Na sulfoisophthalic acid | 1.7 | 5.0 | Sebacic acid | 5.0 | 0.0 |
| Example 8 | 77.3 | 5-Na sulfoisophthalic acid | 1.7 | 10.0 | Adipic acid | 8.0 | 3.0 |
| Comparative Example 1 | 92.3 | 5-Na sulfoisophthalic acid | 1.7 | 6.0 | — | 0.0 | 0.0 |
| Comparative Example 2 | 93.3 | 5-Na sulfoisophthalic acid | 1.7 | 0.0 | Adipic acid | 5.0 | 0.0 |
| Comparative Example 3 | 85.0 | 5-Na sulfoisophthalic acid | 5.0 | 5.0 | Adipic acid | 5.0 | 0.0 |
| Comparative Example 4 | 84.5 | 5-Na sulfoisophthalic acid | 0.5 | 10.0 | Adipic acid | 5.0 | 0.0 |
| Comparative Example 5 | 78.3 | 5-Na sulfoisophthalic acid | 1.7 | 15.0 | Adipic acid | 5.0 | 0.0 |
| Comparative Example 6 | 81.3 | 5-Na sulfoisophthalic acid | 1.7 | 5.0 | Adipic acid | 12.0 | 0.0 |

TABLE 2

| | | Dyeing | | | | Color fastness to washing (grade) | | | Color fastness to light (grade) | |
|---|---|---|---|---|---|---|---|---|---|---|
| | | Degree of exhaustion (%) | | Dyeing concentration | | | Attachment staining | Liquid staining | Light color dye | Deep color dye |
| | Dye | 90° C. | 95° C. | (K/S) | Spinnability | Discoloration | | | | |
| Example 1 | Cation | 96 | 99 | 28 | A | 5 | 5 | 5 | 4< | 4< |
| Example 2 | Cation | 99 | 99 | 29 | A | 5 | 5 | 5 | 4< | 4< |
| Example 3 | Cation | 99 | 99 | 29 | A | 5 | 5 | 5 | 4< | 4< |
| Example 4 | Cation | 99 | 99 | 28 | A | 5 | 5 | 5 | 4< | 4< |
| Example 5 | Cation | 99 | 99 | 28 | B | 5 | 5 | 5 | 4< | 4< |
| Example 6 | Disperse | 98 | 99 | 29 | B | 5 | 5 | 5 | 4< | 4< |
| Example 7 | Cation | 99 | 99 | 29 | A | 5 | 5 | 5 | 4< | 4< |
| Example 8 | Cation | 99 | 99 | 30 | B | 5 | 4-5 | 5 | 4< | 4< |
| Comparative Example 1 | Cation | 68 | 78 | 21 | A | 5 | 4-5 | 5 | 4< | 4< |
| Comparative Example 2 | Cation | 70 | 78 | 20 | A | 5 | 4-5 | 4 | 4< | 4< |
| Comparative Example 3 | Cation | 99 | 99 | 29 | D | 5 | 4-5 | 4-5 | 4< | 4< |
| Comparative Example 4 | Cation | 45 | 58 | 19 | D | 5 | 4-5 | 4-5 | 4< | 4< |
| Comparative Example 5 | Cation | 98 | 99 | 29 | D | 4 | 5 | 5 | 4< | 4< |
| Comparative Example 6 | Cation | 97 | 98 | 29 | D | 3-4 | 4 | 4 | 4< | 4< |

The conjugated fiber of the present invention will be described in more detail below with reference to Examples, but the invention is not limited to the Examples. The amounts of copolymerization of dicarboxylic acid components and glycol components, the glass transition temperature, the melting point, the dyeing method, the degree of exhaustion, the dyeing concentration (K/S), the fineness, and the spinnability were evaluated in accordance with the following methods. The intrinsic viscosity and the physical properties of a conjugated fiber, i.e., the strength at break, the elongation at break, the peeling resistance, and the feeling were evaluated in accordance with the following methods.

<Intrinsic Viscosity dl/g>

Intrinsic viscosity of a polymer: a saponified ethylene-vinyl alcohol-based copolymer (A) was measured with an Ubbelohde' viscometer (Model HRK-3 manufactured by Hayashi Seisakusho Co., Ltd.) at 30° C. or lower using 85% phenol. A polyester copolymer (B) was measured at 30° C. using a phenol/tetrachloroethane (volume ratio 1/1) mixed solvent as a solvent.

<Glass Transition Temperature>

Glass transition temperature was measured at a temperature increase rate of 10° C./min by using a differential scanning calorimeter (DSC-60) manufactured by SHIMADZU CORPORATION.

<Melting Point>

Melting point was measured at a temperature increase rate of 10° C./min by using a differential scanning calorimeter (DSC-60) manufactured by SHIMADZU CORPORATION.

<Strength at Break>

Strength at break was determined from a load-elongation curve produced by using an Instron type tensile tester.

<Elongation at Break>

Elongation at break was determined from a load-elongation curve produced by using an Instron type tensile tester.

<Peeling Resistance>

Adhesiveness of polymers in conjugated fiber (peeling resistance): 24 to 36 filaments were twisted to a count of from 500 to 1000 T/m. In that condition, the twisted strand was cut, and, using a 500-power electronic microscope, the cross section of each filament is observed for polymer peeling.

Ten cross sections were observed, and the sample was evaluated according to the criteria given below.

A: The degree of peeling is less than 10%.
B: The degree of peeling is about 10% to about 20%.
C: The degree of peeling is about 20% to about 50%.
D: The degree of peeling is greater than 50%.

<Feeling Evaluation>

Samples of a fabric dyed under the dyeing condition described above were organoleptically evaluated by ten panelists according to the following criteria.

A: The sample is excellent in moist feeling and soft feeling.
B: The sample is good in moist feeling and soft feeling.
C: The sample is insufficient in moist feeling and soft feeling.
D: The sample lacks in moist feeling and soft feeling.

Example 9

(1) Ethylene and vinyl acetate were radically polymerized at 60° C. using methanol as a polymerization solvent, and thereby a random copolymer having a copolymerization ratio of ethylene of 44 mol % was prepared. Subsequently, saponification treatment was conducted with caustic soda, yielding a saponified ethylene-vinyl acetate copolymer having a degree of saponification of not less than 99%. Subsequently, the wet polymer was subjected repeatedly to washing with a large excess amount of pure water containing a small amount of acetic acid and further repeatedly washing with a large excess amount of pure water, so that the content of K and Na ions and the content of Mg and Ca ions were each adjusted to about 10 ppm or less. Subsequently, water was separated from the polymer with a dehydrating machine and then vacuum drying was further conducted fully at a temperature of not higher than 100° C., affording an ethylene-vinyl alcohol-based copolymer (A) having an intrinsic viscosity of 1.05.

(2) On the other hand, a polyester copolymer (B) having an intrinsic viscosity of 0.65 was obtained by conducting a transesterification reaction and a polycondensation reaction using a total carboxylic acid component containing 88.3 mol % of a terephthalic acid component, 1.7 mol % of a 5-sodiumsulfoisophthalic acid component, 5.0 mol % of a 1,4-cyclohexanedicarboxylic acid component, and 5.0 mol % of an adipic acid component out of all dicarboxylic acid components, ethylene glycol, and the prescribed additives.

(3) Threads were spun by the use of a spinneret having 24 holes (hole diameter: 0.25 mmφ) at a spinning temperature of 240° C. and an output per hole of 1.39 g/min under the condition defined by a conjugate ratio (mass ratio) of the ethylene-vinyl alcohol-based copolymer (A) to the polyester copolymer (B) of 50:50. Subsequently, cooling wind with a temperature of 25° C. and a humidity of 60% was blown to the spun threads at a rate of 0.4 m/second, thereby cooling the threads to 60° C. or lower. Subsequently, the threads were introduced into a tube heater (internal temperature: 185° C.) provided at a position 1.2 m below the spinneret, having a length of 1.0 m, an inlet guide diameter of 8 mm, an outlet guide diameter of 10 mm, and an inner diameter of 30 mmφ and then were stretched within the tube heater. Subsequently, oil was provided to the threads discharged from the tube heater by using an oiling nozzle, followed by winding the threads via two haul-off rollers at a rate of 4000 m/min, so that conjugated fiber filaments of 84T/24f were obtained. In the conjugated fiber, the number of projections of the core component (the polyester copolymer (B)) was 30, the ratio of the circumferential length (L1) of the conjugated fiber to the circumferential length (L2) of the core component (the polyester copolymer (B)) was 2.8, and X/C was 5.6. The result of peeling at the interface between the core and the sheath was given in Table 3. The yarn formation conditions and the spinnability at that time and the dyeing fastness properties and feeling of the resulting fibers are shown in Tables 3 and 4.

(4) The conjugated fiber prepared using the production method of the present invention exhibited good normal pressure dyeability and specifically, it had a degree of exhaustion of 85% at 90° C. and 91% at 95° C. and a dyeing concentration (K/S) of 28. Moreover, the resulting conjugated fiber has wet good feeling. There were also no problems with their quality with respect to color fastness to washing and color fastness to light.

Examples 10 to 18

Conjugated fiber filaments of 84T/24f were prepared by performing spinning in the same procedures as Example 1 except for changing the amounts of copolymerization of terephtalic acid, 5-sodiumsulfoisophthalic acid, 1,4-cyclohexanedicarboxylic acid, adipic acid, and sebacic acid at the time of the production of the polyester copolymer (B), the amount of copolymerization of the ethylene-vinyl alcohol-based copolymer (A), the sectional shape, and the conjugation ratio as given in Table 3. Physical properties of the fibers obtained are shown in Tables 3 and 4. All were good in spinnability and normal pressure dyeability (degree of exhaustion, K/S, fastness property) and had quality with no problems. Moreover, the resulting conjugated fiber has wet good feeling. There were also no problems with their quality with respect to color fastness to washing and color fastness to light.

Examples 19 to 21

Operations were conducted in the same procedures as Example 1 except for changing the sectional shape of the conjugated fiber and the number of projections as given in Table 3. In every case, conjugated fibers being superior in peeling resistance and good in feeling were obtained and they had no problem with their quality with respect to color fastness to washing and color fastness to light.

Comparative Examples 7 to 14

Conjugated fiber filaments of 84T/24f were prepared by performing spinning in the same procedures as Example 1 except for changing the amounts of copolymerization of terephtalic acid, 5-sodiumsulfoisophthalic acid, 1,4-cyclohexanedicarboxylic acid, and an aliphatic dicarboxylic acid at the time of the production of the polyester copolymer (B), the amount of copolymerization of the ethylene-vinyl alcohol-based copolymer (A), and the sectional shape as given in Table 3. Physical properties of the fibers obtained are shown in Tables 3 and 4.

In Comparative Example 7, the degree of exhaustion and the dyeing concentration were insufficient because of failure in copolymerizing a 5-sodiumsulfoisophthalic acid component, a 1,4-cyclohexanedicarboxylic acid component, or an aliphatic dicarboxylic acid component, resulting in a fiber property that normal pressure dyeability was not exhibit.

In Comparative Example 8, the large amount of copolymerization of the 5-sodiumsulfoisophthalic acid component resulted in poor spinnability.

In Comparative Example 9, the amount of copolymerization of the 1,4-cyclohexanedicarboxylic acid component was adjusted to 15.0 mol %, which was out of the composition of the present invention. As a result, the resulting fiber was poor in spinnability though they were sufficient in degree of exhaustion and dyeing concentration.

In Comparative Example 10, the amount of copolymerization of the 1,4-cyclohexanedicarboxylic acid component and that of the adipic acid component were adjusted to 12.0 mol % and 12.0 mol %, and the amount of copolymerization of the terephthalic acid component was adjusted to 74.3 mol %, which was out of the composition of the present invention. As a result, spinning was impossible.

In Comparative Example 11, the amount of the adipic acid component was adjusted to 12.0 mol %, which was out of the composition of the present invention. As a result, the resulting fibers were poor in spinnability though they were sufficient in degree of exhaustion and dyeing concentration.

In Comparative Example 12, spinning was impossible because of the small amount of copolymerization of ethylene in the ethylene-vinyl alcohol-based copolymer (A).

In Comparative Example 13, the yarn production step efficiency was good, but the feeling and the hydrophilicity were poor because of the large amount of copolymerization of ethylene in the ethylene-vinyl alcohol-based copolymer (A).

In Comparative Example 14, since no 1,4-cyclohexanedicarboxylic acid component or no aliphatic dicarboxylic acid component was copolymerized, the degree of exhaustion and the dyeing concentration were insufficient, resulting in fiber properties failing to exhibit normal pressure dyeability.

TABLE 3

| | Copolymer (A) | | | Polymer polyester (B) (mol %) | | | | | | |
|---|---|---|---|---|---|---|---|---|---|---|
| | Amount of copolymerization of ethylene (mol %) | Degree of saponification (%) | | (a) | | (b) | (c) | | Conjugation ratio |
| | | | TA*1 | SIP*2 | BPIS*3 | CHDA*4 | ADA*5 | SBA*6 | |
| Example 9 | 44 | 99 | 88.3 | 1.7 | 0 | 5.0 | 5.0 | 0 | 50/50 |
| Example 10 | 44 | 99 | 87.5 | 2.5 | 0 | 5.0 | 5.0 | 0 | 50/50 |
| Example 11 | 44 | 99 | 87.5 | 0 | 2.5 | 5.0 | 5.0 | 0 | 50/50 |
| Example 12 | 44 | 99 | 82.3 | 1.7 | 0 | 9.0 | 7.0 | 0 | 50/50 |
| Example 13 | 44 | 99 | 92.3 | 1.7 | 0 | 3.0 | 3.0 | 0 | 50/50 |
| Example 14 | 44 | 99 | 88.3 | 1.7 | 0 | 5.0 | 0 | 5.0 | 50/50 |
| Example 15 | 25 | 99 | 88.3 | 1.7 | 0 | 5.0 | 5.0 | 0 | 50/50 |
| Example 16 | 60 | 99 | 88.3 | 1.7 | 0 | 5.0 | 5.0 | 0 | 50/50 |
| Example 17 | 44 | 99 | 88.3 | 1.7 | 0 | 5.0 | 5.0 | 0 | 10/90 |
| Example 18 | 44 | 99 | 88.3 | 1.7 | 0 | 5.0 | 5.0 | 0 | 90/10 |
| Example 19 | 44 | 99 | 88.3 | 1.7 | 0 | 5.0 | 5.0 | 0 | 50/50 |
| Example 20 | 44 | 99 | 88.3 | 1.7 | 0 | 5.0 | 5.0 | 0 | 50/50 |
| Example 21 | 44 | 99 | 88.3 | 1.7 | 0 | 5.0 | 5.0 | 0 | 90/10 |
| Comparative Example 7 | 44 | 99 | 100.0 | 0 | 0 | 0 | 0 | 0 | 50/50 |
| Comparative Example 8 | 44 | 99 | 85.0 | 5.0 | 0 | 5.0 | 5.0 | 0 | 50/50 |
| Comparative Example 9 | 44 | 99 | 78.3 | 1.7 | 0 | 15.0 | 5.0 | 0 | 50/50 |
| Comparative Example 10 | 44 | 99 | 74.3 | 1.7 | 0 | 12.0 | 12.0 | 0 | 50/50 |
| Comparative Example 11 | 44 | 99 | 81.3 | 1.7 | 0 | 5.0 | 12.0 | 0 | 50/50 |
| Comparative Example 12 | 5 | 99 | 88.3 | 1.7 | 0 | 5.0 | 5.0 | 0 | 50/50 |
| Comparative Example 13 | 80 | 99 | 88.3 | 1.7 | 0 | 5.0 | 5.0 | 0 | 50/50 |
| Comparative Example 14 | 44 | 99 | 98.3 | 1.7 | 0 | 0 | 0 | 0 | 50/50 |

| | Cross-sectional shape | The number of projections | Interval between projections (I) (μm) | Angle (R) (°) | L2/L1 | (L2/L1)/C | Conjugated fiber flatness | Peeling resistance |
|---|---|---|---|---|---|---|---|---|
| Example 9 | FIG. 1 | 30 | 0.7 | 80-90 | 2.8 | 5.6 | 1.1 | A |
| Example 10 | FIG. 1 | 30 | 0.7 | 80-90 | 2.8 | 5.6 | 1.1 | A |
| Example 11 | FIG. 1 | 30 | 0.7 | 80-90 | 2.7 | 5.4 | 1.2 | A |
| Example 12 | FIG. 1 | 30 | 0.7 | 80-90 | 2.8 | 5.6 | 1.1 | A |
| Example 13 | FIG. 1 | 30 | 0.7 | 80-90 | 2.8 | 5.6 | 1.1 | A |
| Example 14 | FIG. 1 | 30 | 0.7 | 80-90 | 3.0 | 6.0 | 1.3 | A |
| Example 15 | FIG. 1 | 30 | 0.7 | 80-90 | 2.8 | 5.6 | 1.0 | B |
| Example 16 | FIG. 1 | 30 | 0.7 | 80-90 | 2.8 | 5.6 | 1.0 | A |
| Example 17 | FIG. 1 | 30 | 0.7 | 80-90 | 0.8 | 0.8 | 1.2 | B |
| Example 18 | FIG. 1 | 30 | 0.7 | 80-90 | 5.3 | 5.9 | 1.2 | B |
| Example 19 | FIG. 2 | — | — | — | — | — | 1.1 | B |
| Example 20 | FIG. 3 | 50 | 0.35 | 80-90 | 4.7 | 9.4 | 2.2 | A |
| Example 21 | FIG. 1 | 6 | 3.2 | 80-90 | 0.9 | 1.8 | 1.5 | B |
| Comparative Example 7 | FIG. 2 | 30 | 0.7 | 80-90 | 2.9 | 5.8 | 1.0 | A |
| Comparative Example 8 | FIG. 2 | 30 | 0.7 | 80-90 | 2.9 | 5.8 | 1.1 | B |
| Comparative Example 9 | FIG. 2 | 30 | 0.7 | 80-90 | 2.8 | 5.6 | 1.1 | B |
| Comparative Example 10 | — | — | — | — | — | — | — | — |
| Comparative Example 11 | FIG. 2 | 30 | 0.7 | 80-90 | 2.8 | 5.6 | 1.1 | B |
| Comparative Example 12 | — | — | — | — | — | — | — | — |
| Comparative Example 13 | FIG. 2 | 30 | 0.7 | 80-90 | 2.5 | 5.0 | 1.1 | A |

TABLE 3-continued

| | | | | | | | | |
|---|---|---|---|---|---|---|---|---|
| Comparative Example 14 | FIG. 3 | 50 | 0.35 | 80-90 | 4.8 | 9.6 | 2.3 | A |

*[1]Terephthalic acid
*[2]5-Sodiumsulfoisophthalic acid
*[3]Tetrabutylphosphoniumsulfoisophthalic acid
*[4]Cyclohexanedicarboxylic acid
*[5]Adipic acid
*[6]Sebacic acid

TABLE 4

| | | Dyeing | | | | Color fastness to washing (grade) | | Color fastness to light (grade) | | |
|---|---|---|---|---|---|---|---|---|---|---|
| | | Degree of exhaustion (%) | | Dyeing concentration | | | | | | |
| | Dye | 90° C. | 95° C. | (K/S) | Spinnability | Discoloration | Attachment Staining | Liquid Staining | Light color dye | Deep color dye | Feeling evaluation |
| Example 9 | Cation | 85 | 91 | 28 | A | 5 | 5 | 5 | 4< | 4< | A |
| Example 10 | Cation | 90 | 96 | 29 | A | 5 | 5 | 5 | 4< | 4< | A |
| Example 11 | Cation | 87 | 90 | 27 | B | 5 | 5 | 5 | 4< | 4< | A |
| Example 12 | Disperse | 85 | 89 | 27 | B | 4-5 | 4-5 | 4-5 | 4< | 4< | A |
| Example 13 | Cation | 82 | 85 | 27 | A | 5 | 5 | 5 | 4< | 4< | A |
| Example 14 | Cation | 84 | 89 | 27 | A | 5 | 5 | 5 | 4< | 4< | A |
| Example 15 | Cation | 84 | 90 | 26 | B | 4-5 | 4-5 | 4-5 | 4< | 4< | A |
| Example 16 | Cation | 85 | 91 | 29 | A | 5 | 5 | 5 | 4< | 4< | B |
| Example 17 | Cation | 89 | 93 | 28 | A | 5 | 5 | 5 | 4< | 4< | B |
| Example 18 | Cation | 82 | 85 | 26 | B | 4-5 | 4-5 | 4-5 | 4< | 4< | A |
| Example 19 | Cation | 84 | 91 | 27 | B | 5 | 5 | 5 | 4< | 4< | A |
| Example 20 | Cation | 83 | 91 | 27 | A | 5 | 5 | 5 | 4< | 4< | A |
| Example 21 | Cation | 82 | 90 | 27 | A | 5 | 5 | 5 | 4< | 4< | A |
| Comparative Example 7 | Cation | 30 | 41 | 20 | A | 4 | 3 | 3 | 4< | 4< | D |
| Comparative Example 8 | Cation | 94 | 97 | 21 | D | 5 | 4-5 | 4 | 4< | 4< | B |
| Comparative Example 9 | Cation | 92 | 95 | 27 | D | 5 | 4-5 | 5 | 4< | 4< | C |
| Comparative Example 10 | Cation | — | — | — | — | — | — | — | — | — | — |
| Comparative Example 11 | Cation | 89 | 95 | 25 | D | 4 | 4-5 | 4-5 | 4< | 4< | B |
| Comparative Example 12 | Cation | — | — | — | — | — | — | — | — | — | — |
| Comparative Example 13 | Cation | 85 | 90 | 26 | A | 4-5 | 4-5 | 4-5 | 4< | 4< | D |
| Comparative Example 14 | Cation | 49 | 65 | 21 | A | 4-5 | 4-5 | 4-5 | 4 | 4 | D |

The invention claimed is:

1. A yarn comprising fibers consisting of:
a polyester copolymer;
wherein:
the polyester copolymer consists of a dicarboxylic acid component and a glycol component;
the dicarboxylic acid component comprises:
75 mol % or more of a component derived from terephthalic acid;
from 1.0 mol % to 3.5 mol % of a component derived from a compound represented by formula (I):

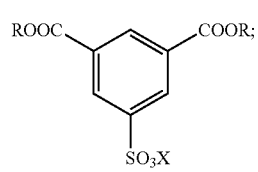

(I)

from 2.0 mol % to 10.0 mol % of a component derived from a cyclohexane dicarboxylic acid; and
from 2.0 mol % to 8.0 mol % of a component derived from an aliphatic dicarboxylic acid;
R represents hydrogen, an alkyl group having from 1 to 10 carbon atoms, or a 2-hydroxyethyl group;
X represents a metal ion, a quaternary phosphonium ion, or a quaternary ammonium ion;
the glycol component consists of a component derived from ethylene glycol;
breakage of the yarn occurs at a frequency of once or not at all during spinning, when spinning is carried out at an output per hole of 1.57 g/min, using a spinneret with 24 holes having a hole diameter of 0.20 mmφ, continuously for 24 hours; and
a degree of exhaustion of the fibers is at least 80% at 90° C. and at least 85% at 95° C.

2. A yarn comprising conjugated fibers consisting of:
a polyester copolymer; and
an ethylene-vinyl alcohol-based copolymer comprising from 25 to 60 mol % of a component derived from ethylene;

wherein:
the polyester copolymer consists of a dicarboxylic acid component and a glycol component;
the dicarboxylic acid component comprises:
  75 mol % or more of a component derived from terephthalic acid;
  from 1.0 mol % to 3.5 mol % of a component derived from a compound represented by formula (I):

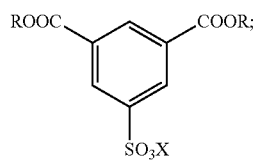

from 2.0 mol % to 10.0 mol % of a component derived from a cyclohexane dicarboxylic acid; and
  from 2.0 mol % to 8.0 mol % of a component derived from an aliphatic dicarboxylic acid;
the ethylene-vinyl alcohol-based copolymer is exposed on at least a portion of a surface of the conjugated fiber;
R represents hydrogen, an alkyl group having from 1 to 10 carbon atoms, or a 2-hydroxyethyl group;
X represents a metal ion, a quaternary phosphonium ion, or a quaternary ammonium ion;
the glycol component consists of a component derived from ethylene glycol;
breakage of the yarn occurs at a frequency of once or not at all during spinning, when spinning is carried out at an output per hole of 1.57 g/min, using a spinneret with 24 holes having a hole diameter of 0.20 mmφ, continuously for 24 hours; and
a degree of exhaustion of the fibers is at least 80% at 90° C. and at least 85% at 95° C.

3. The yarn according to claim 2, wherein:
the polyester copolymer comprises four or more projections at an interface with the ethylene-vinyl alcohol-based copolymer in a cross sectional configuration of the conjugated fiber;
a major axis of each of the four or more projections has an angle of 90°±15° with respect to a cross sectional circumference of the conjugated fiber;
a ratio of a circumferential length (L2) of the polyester copolymer to a circumferential length (L1) of the conjugated fiber satisfies 1.6≤X/C;
X is the ratio (L2/L1) of the circumferential length of the polyester copolymer to the circumferential length of the conjugated fiber; and
C is a mass conjugation ratio of the polyester copolymer where a whole conjugated fiber is taken as 1.

4. The yarn according to claim 3, wherein:
the polyester copolymer comprises ten or more projections at the interface; and
an interval between neighboring projections is 1.5 μm or less.

5. The yarn according to claim 2, wherein a mass conjugation ratio of the ethylene-vinyl alcohol-based copolymer to the polyester copolymer is from 10:90 to 90:10.

6. The yarn according to claim 2, wherein the dicarboxylic acid component comprises:
  75 mol % or more of the component derived from terephthalic acid;
  from 1.0 mol % to 3.5 mol % of the component derived from the compound represented by formula (I);
  from 3.0 mol % to 8.0 mol % of the component derived from the cyclohexane dicarboxylic acid; and
  from 2.0 mol % to 8.0 mol % of the component derived from the aliphatic dicarboxylic acid.

* * * * *